United States Patent
Du et al.

(10) Patent No.: US 11,573,734 B2
(45) Date of Patent: Feb. 7, 2023

(54) METHOD FOR IMPROVING READ-RETRY OF FLASH MEMORY AND RELATED CONTROLLER AND STORAGE DEVICE

(71) Applicant: Silicon Motion, Inc., Hsinchu County (TW)

(72) Inventors: Jian-Dong Du, Taoyuan (TW); Pi-Ju Tsai, New Taipei (TW); Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 348 days.

(21) Appl. No.: 16/732,333

(22) Filed: Jan. 1, 2020

(65) Prior Publication Data

US 2020/0225876 A1 Jul. 16, 2020

(30) Foreign Application Priority Data

Jan. 10, 2019 (TW) .................................. 108100961

(51) Int. Cl.
*G06F 3/06* (2006.01)
*G06F 11/07* (2006.01)

(52) U.S. Cl.
CPC .......... *G06F 3/0659* (2013.01); *G06F 3/0619* (2013.01); *G06F 3/0652* (2013.01); *G06F 3/0679* (2013.01); *G06F 11/0727* (2013.01); *G06F 11/0751* (2013.01); *G06F 11/0793* (2013.01)

(58) Field of Classification Search
CPC .... G06F 3/0659; G06F 3/0619; G06F 3/0652; G06F 3/0679; G06F 11/0727; G06F 11/0751; G06F 11/0793
See application file for complete search history.

(56) References Cited

U.S. PATENT DOCUMENTS

| | | |
|---|---|---|
| 5,517,250 A | 5/1996 | Hoogenboom |
| 6,798,418 B1 | 9/2004 | Sartori |
| 7,315,916 B2 | 1/2008 | Bennett |
| 7,859,932 B2 | 12/2010 | Mokhlesi |
| 8,983,902 B2 | 3/2015 | Martick |
| 9,686,051 B2 | 6/2017 | DiStasi |
| 9,916,211 B2 | 3/2018 | Berger |
| 10,031,699 B1 | 7/2018 | Graniello |
| 10,163,471 B2 | 12/2018 | Kwok |
| 10,199,108 B2 | 2/2019 | Zhou |

(Continued)

FOREIGN PATENT DOCUMENTS

| | | |
|---|---|---|
| CN | 1110958 C | 6/2003 |
| CN | 101124554 A | 2/2008 |

(Continued)

*Primary Examiner* — Jigar P Patel
(74) *Attorney, Agent, or Firm* — Winston Hsu (57) ABSTRACT

The present invention proposes a method for managing a plurality of memory units in a flash memory module. The method includes: creating a programed timestamp corresponding to each first memory unit according to a data-written time of said each first memory unit; selecting a corresponding read-retry table for performing a read operation upon said each first memory unit according to the programed timestamp of said each first memory unit; and performing a first refresh operation according to program timestamps of first memory units that have been written with data.

15 Claims, 6 Drawing Sheets

(56) References Cited

U.S. PATENT DOCUMENTS

| | | | |
|---|---|---|---|
| 10,216,422 B2 | 2/2019 | Kim | |
| 10,394,652 B2 | 8/2019 | Choi | |
| 2013/0159785 A1* | 6/2013 | Hashimoto | G11C 29/52 |
| | | | 714/47.2 |
| 2014/0334224 A1* | 11/2014 | Cordero | G11C 11/406 |
| | | | 365/149 |
| 2017/0075574 A1* | 3/2017 | Oikawa | G06F 12/0238 |
| 2017/0162261 A1 | 6/2017 | Chevallier | |
| 2018/0101430 A1* | 4/2018 | Ou | G11C 29/52 |
| 2018/0330796 A1* | 11/2018 | Tsubo | G11C 8/12 |
| 2018/0373625 A1 | 12/2018 | Liu | |
| 2020/0019458 A1* | 1/2020 | Cadloni | G11C 29/44 |
| 2020/0185045 A1* | 6/2020 | Chen | G11C 29/42 |

FOREIGN PATENT DOCUMENTS

| | | |
|---|---|---|
| CN | 102246241 A | 11/2011 |
| CN | 105278866 A | 1/2016 |
| CN | 106251903 A | 12/2016 |
| CN | 107797821 A | 3/2018 |
| CN | 108108810 A | 6/2018 |
| TW | 200845007 | 11/2008 |

* cited by examiner

METHOD FOR IMPROVING READ-RETRY OF FLASH MEMORY AND RELATED CONTROLLER AND STORAGE DEVICE

BACKGROUND OF THE INVENTION

1. Field of the Invention

The present invention relates to a flash memory, and more particularly, to a method for improving read-retry of a flash memory, and an associated storage device and controller.

2. Description of the Prior Art

In recent years, the flash memory has become widely used, especially in various portable devices. This is because the flash memory has advantages such as high speed, high density and non-volatile characteristics in comparison with other traditional storage techniques. However, despite all those advantages, the flash memory still has some noticeable defects, such as insufficient life span and data retention problems. After being used for certain times, the memory units (e.g. blocks) in the flash memory may encounter errors and thus cannot read data correctly. The occurrence of errors is highly related to the programming/erasing cycle and the data storing time. Usually, with the increased erase times of the flash memory as well as not updating the storage data for long could raise the possibility of encountering errors. Hence, the controller must constantly perform read-retry on the flash memory, and enhance the correctness of reading data via adjusting the read voltage. However, during the read-retry, considering there are many variables such as increased erase times and data retention problems mentioned above, to correctly read data requires the use of combinations of different read voltages, which causes the latency in the process and reduces the efficiency of reading.

SUMMARY OF THE INVENTION

To address the above problem, the present invention hereby proposes a managing scheme for a flash memory device to improve the read-retry efficiency. The method provided by the present invention periodically refreshes the data stored in memory units of the flash memory in order to mitigate the influence on the read-retry caused by the data retention time imposes. That is, the storing time of data in the memory units will merely vary within a small range, which may effectively reduce the adjustment range of the read voltage in the read-retry operation. In another aspect, the present invention also proposes an error check mechanism in order to conditionally refresh memory units that have a high error rate, in order to reduce the loads of the read-retry operation.

An embodiment of the present invention proposes a method for managing a plurality of memory units in a flash memory module. The method comprises: creating a programed timestamp corresponding to each first memory unit according to a data-written time of said each first memory unit; selecting a corresponding read-retry table for performing a read operation upon said each first memory unit according to the programed timestamp of said each first memory unit; and performing a first refresh operation according to program timestamps of first memory units that have been written with data.

An embodiment of the present invention proposes a controller for managing a plurality of memory units of a flash memory. The controller comprises a storage unit and a processing unit. The storage unit is arranged to store a program code. The processing unit is coupled to the storage unit, and is arranged to read the program code from the storage unit in order to execute the program code to perform following operations: creating a programed timestamp correspond to each first memory unit for a data-written time of said each first memory unit; selecting a corresponding read-retry table to perform a read operation upon said each first memory unit according to the programed timestamp of said each first memory unit; and executing a first refresh operation according to programed timestamps of first memory units that have been written with data.

An embodiment of the present invention proposes a storage device which comprises a flash memory module and a controller. The flash memory module comprises a plurality of memory units. The controller is arranged to access flash memory module, and comprising a storage unit and a processing unit. The storage unit is arranged to store a program code. The processing unit is coupled to the storage unit, and is arranged to read the program code from the storage unit in order to execute the program code to perform following operations: creating a programed timestamp correspond to each first memory unit for a data-written time of said each first memory unit; selecting a corresponding read-retry table to perform a read operation upon said each first memory unit according to the programed timestamp of said each first memory unit; and executing a first refresh operation according to programed timestamps of first memory units that have been written with data.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods are not necessarily described in detail in order to avoid obscuring the present embodiments.

Additionally, any examples or illustrations given hereinafter shall not be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of codes, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 1:
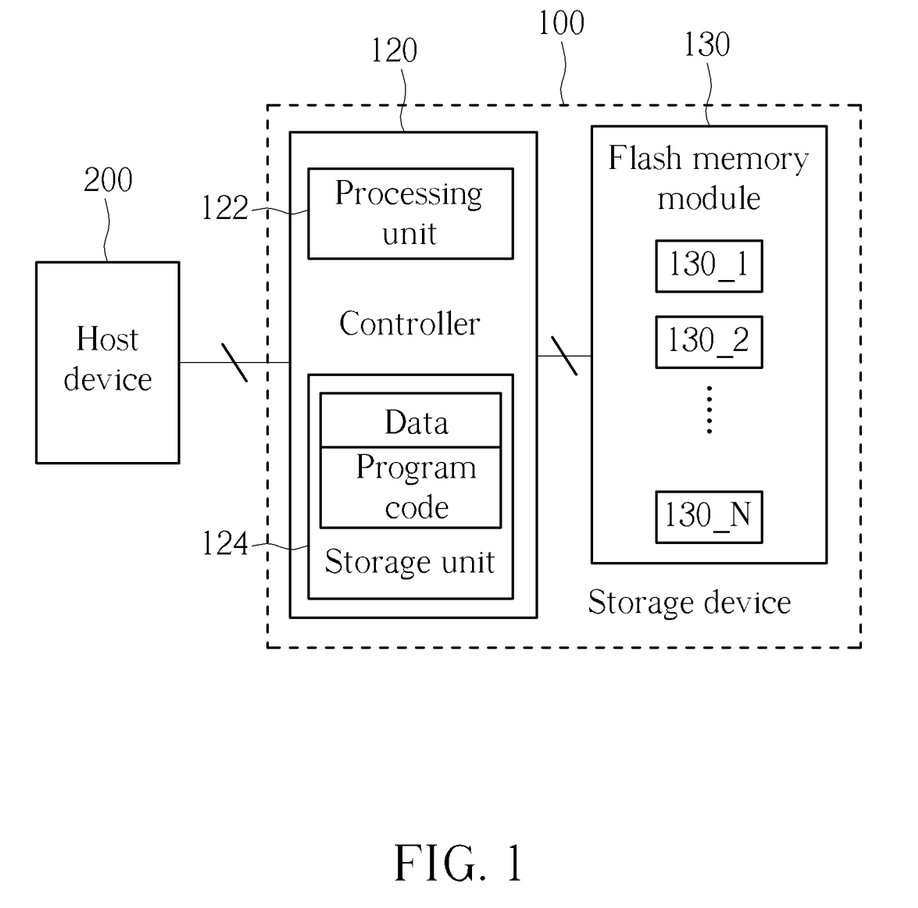
FIG. 1 illustrates the architecture of a storage device, an associated controller and flash memory module according to an embodiment of the present invention.

FIG. 1 illustrates the architecture of a storage device 100, associated controller 120 and flash memory module 130 according to an embodiment of the present invention. As shown in FIG. 1, the storage device 100 comprises a controller 120 and a flash memory module 130, and is controlled by a host device 200, wherein the storage device 100 may be part of the host device 200. The host device 200 may comprise at least one central processing unit (CPU) (not shown) to control operations of the host device 200 via operating an operating system (OS) and an application, in order to interact with peripheral devices. The storage device 100 may provide storage space for the host device 200, as well as program codes and data necessary for the storing operations of the OS and various applications. Examples of the host device 50 may comprise (but are not limited to): a multifunctional mobile phone, tablet, wearable device and personal computer (such as a desktop or laptop computer. Examples of the storage device 100 may comprise (but are not limited to): solid state drives (SSD) and various embedded storage devices (e.g. the storage devices conforming to the UFS or EMMC specifications).

The controller 120 may access the flash memory module 130. In one embodiment, the flash memory module 130 may be a stereo (also dubbed as 3D) NAND flash, and may comprise at least one flash memory chip, but this is not meant to be a limitation of the present invention. Each flash memory chip comprises a plurality of blocks. The controller 120 may use "block" as the unit of performs data erasing upon the flash memory module 130. Further, a block may record a specific number of pages, and the controller 120 may use "page" as the unit to write data into the flash memory module 130.

The controller 120 may comprise a processing circuit (e.g. the microprocessor 122 and the storage unit 124), such as a read only memory (ROM). The ROM 124 is mainly used for storing program codes and specific data, and the microprocessor 122 is used for executing program codes to control the access of the flash memory module 130. Further, the controller 120 may comprise other interface logic for assisting the operations described hereinafter, such as control logics, buffers, etc., but those elements are omitted here for brevity. One skilled in the art should be readily to know how to properly combine well-known circuits with the circuit elements and architectures disclosed in the present invention, and thereby realizes various operations and associated applications mentioned in the embodiments of the present invention.

In this embodiment, the host device 200 may indirectly access the storage device 100 by transmitting a host command and corresponding logic address to the controller 120. The controller 120 receives the host command (e.g. a reading command or a writing command) as well as the logic address, and translates the host command into a memory operating command and then use the operating command to control the flash memory module 130 to read, write, program or erase memory units, pages or blocks of a specific physical address in the flash memory module 130. Moreover, the controller 120 may also execute the program code, and/or execute a series of operations according to data in the storage unit 124 in order to perform a series of operations to implement the specific operation mentioned in the follows.

Regarding reading operations, if the controller 120 cannot read correct data in one single reading operation, the controller 120 will read one or more read-retry tables stored in the storage unit 124 and control the flash memory module 130 to read data having different reading voltages according to the reading voltages recorded in the read-retry table, in order to correctly read the data required by the host device 200.

In the present invention, how the controller 120 selects the read-retry table is based on the data preservation time. The controller 120 may create a programed timestamp corresponding to the first memory unit based on time information corresponding to the writing operation of each first memory unit in the flash memory module 130. Later, when the host device 200 sends the reading command, the controller 120 will select the read-retry table according to information and system time in the programed timestamp. In one embodiment, the first memory unit may be a super block.

Figure 2:
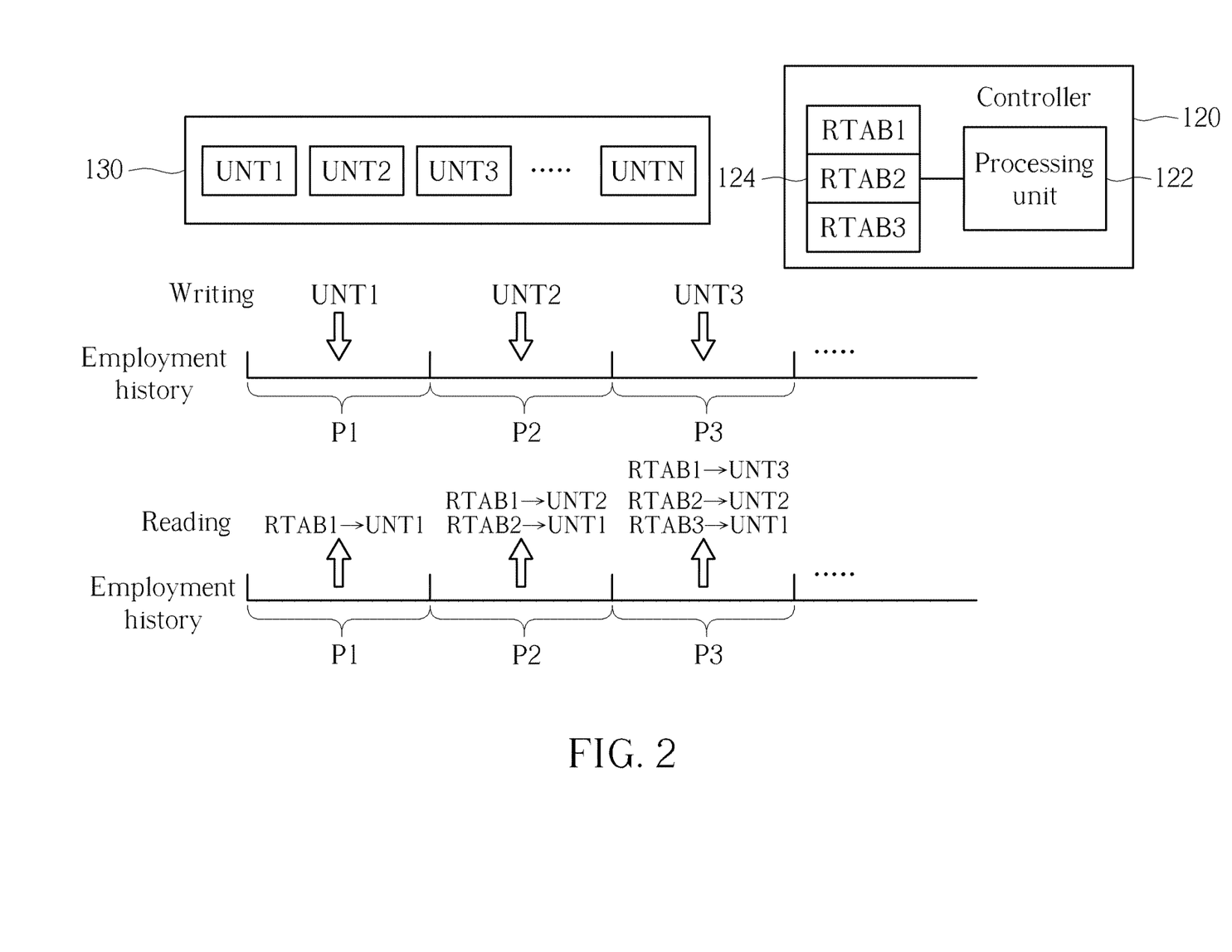
FIG. 2 illustrates how to select a read-retry table according to an embodiment of the present invention.

Please further refer to the example shown in FIG. 2. This example assumes that the flash memory module 130 comprises first memory units UNT1-UNTM, but the present invention is not limited thereto. The employment history P1 records that there is data written into the first memory unit UNT1, the employment history P2 records that there is data written into the first memory unit UNT2, and the employment history P3 records that there is data written into the first memory unit UNT3. Therefore, in the employment history P1, when the host device 200 issues the reading command that demands reading data in the first memory unit UNT1, the controller 120 perform reading by using a retry-table RTAB1. In the employment history P2, when the host device 200 sends a reading command that demands reading data in the first memory unit UNT1, the controller 120 will perform reading by using the read-retry table RTAB2. In addition, in the employment history P2, the reading operation for the data in the second memory unit UNT2 will be performed by using the retry-table RTAB1. In the employment history P3, when the host device 200 sends a reading command that demands reading data in first memory unit UNT1, the first memory unit UNT2 and the first memory unit UNT3, the controller 120 will perform reading by using the read-retry tables RTAB3, RTAB2 and RTAB1 respectively, wherein the read-retry tables RTAB3, RTAB2 and RTAB1 are respectively suitable for reading data with long data preservation time, data with medium data preservation time and data with short data preservation time.

In an embodiment, for reducing the number of read-retry tables so as to raise the efficiency of read-retry, the controller 120 may globally and periodically perform a first refresh operation for the programed timestamp corresponding to a first memory unit in the flash memory module 130. Please refer to the example in FIG. 3 to further understand the operational theories and influences of the first refresh operation of the present invention. As shown in the figure, assuming that the flash memory 130 comprises first memory units UNT1-UNTM (but the present invention is not limited thereto), the controller 120 may maintain a refresh list RLIST in the storage unit 124 to record the programed timestamps respectively corresponding to the first memory units, and may perform the refreshing operation according to the sequential order.

Figure 3:
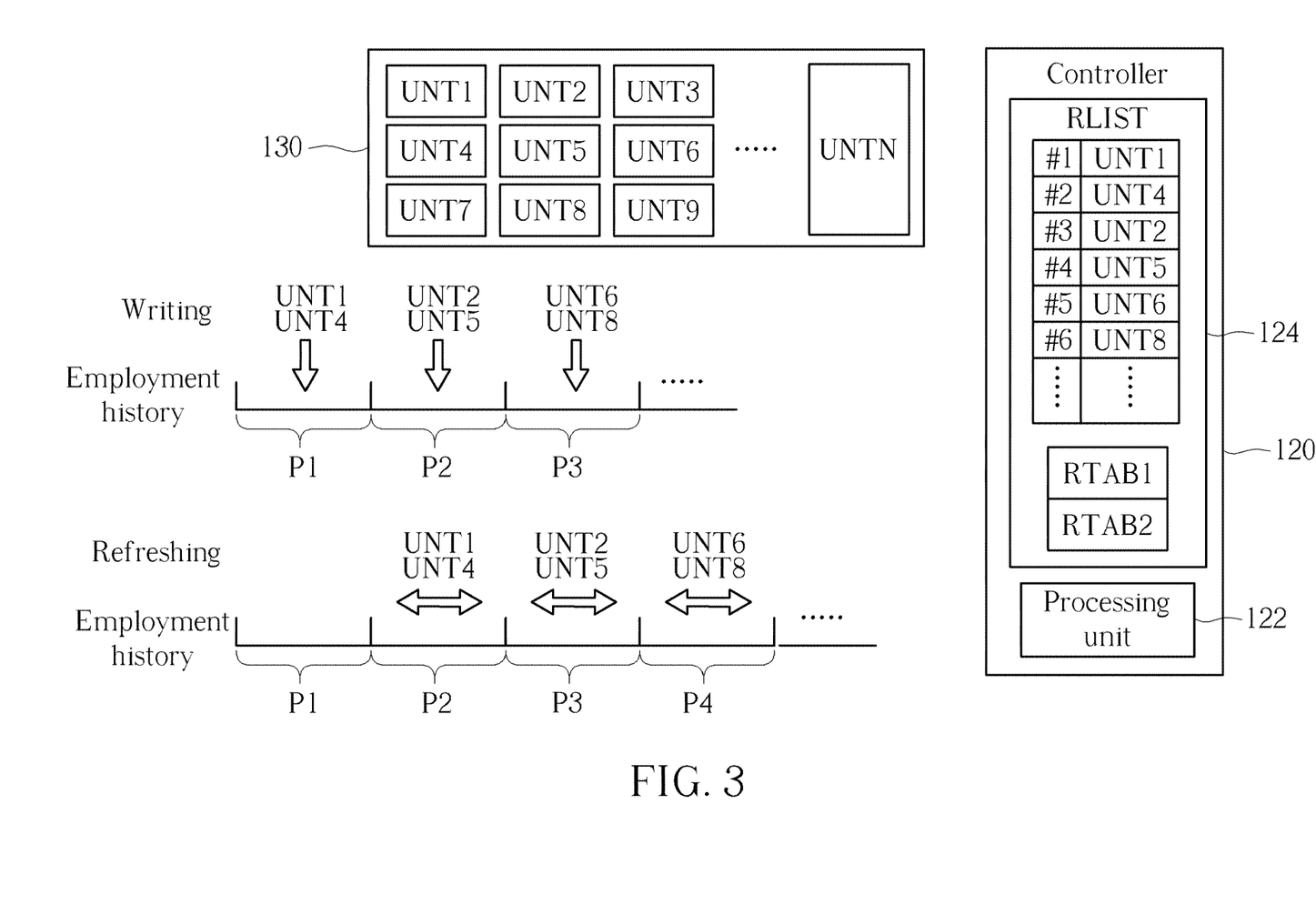
FIG. 3 illustrates perform how to perform a first refresh operation on a first memory unit according to an embodiment of the present invention.

This embodiment assumes the following conditions: the first memory units UNT1 and UNT4 are written with data in the employment history P1; the first memory units UNT2 and UNT5 are written with data in the employment history P2; and the first memory units UNT6 and UNT8 are written with data in the employment history P3. The controller 120 will select the current employment history and perform refreshing upon a first memory unit in the previous employment history that is written with data, and finish the refreshing operation before the current employment history is over. As taught in this embodiment, in the employment history P2, the controller 120 refers to the sequential order of the refresh list RLIST to perform refreshing upon the first memory units UNT1 and UNT4 that are have been written with data in the previous employment history P1, wherein the refreshing is finished within the employment history P2; in the employment history P3, the controller 120 refers to the sequential order of the refresh list RLIST to perform refreshing upon the first memory units UNT2 and UNT5 of the previous employment history P2 that have been written with data in the previous employment history P2, wherein the refreshing is finished within the employment history P3; in the employment history P4, the controller 120 refers to the sequential order of the refresh list RLIST to perform refreshing upon the first memory units UNT6 and UNT8 of the previous employment history P3 that have been written with data in the previous employment history P3, wherein the refreshing is finished within the employment history P4. Further, the first memory unit newly written via the refresh operation will also be refreshed in the next employment history. For example, assuming in the employment history P2, data is moved to the first memory units UNT3 and UNT7 according to the refresh operations of the first memory units UNT1 and UNT4, the first memory units UNT3 and UNT7 will be refreshed in the employment history P3, and so on.

In this way, amongst the data preserving time of any first memory unit in the flash memory module 130, the length of the longest data preserving time only equals to the length of two employment histories combined (assuming the latest finish time of the refreshing can be up until an employment history is over). Hence, the storage unit 124 of the controller 120 only needs to store two read-retry tables RTAB1 and RTAB2 to be able to cover all read errors resulted from data being stored for long. For example, when attempting to read the data in the first memory unit UNT1 of the employment history P2, if in this moment, the data in the first memory unit UNT1 has been moved to the first memory unit UNT3 via the aforementioned refresh operation, only the read-retry table RTAB1 is needed for reading. Similarly, when attempting to read data in the first memory unit UNT4 of the employment history P2, in this moment, if the data in the first memory unit UNT4 has not yet been refreshed, the read-retry table RTAB2 will be needed for reading.

Figure 4:
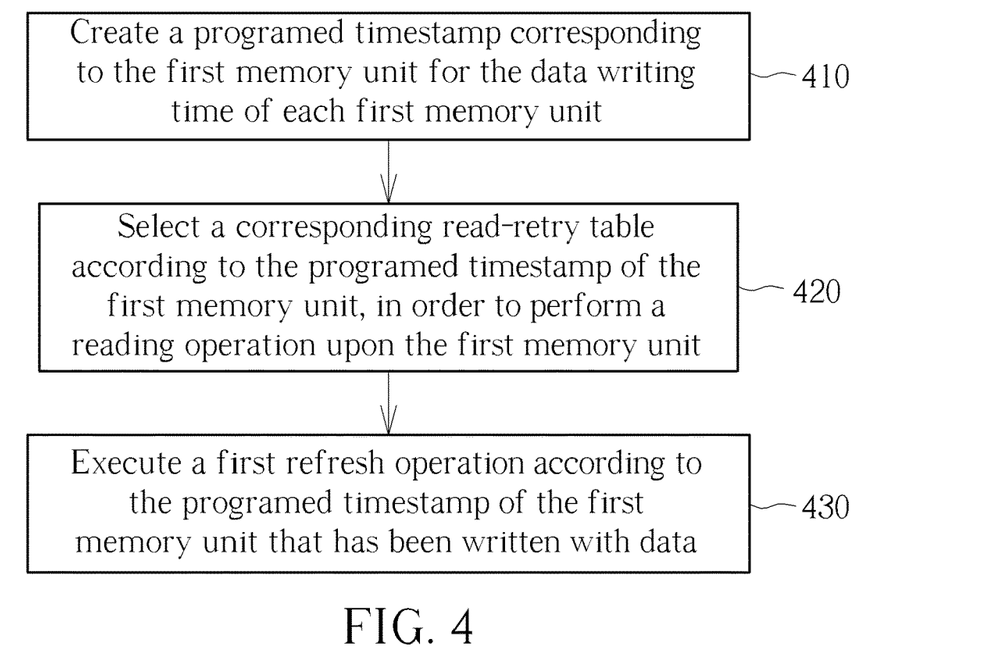
FIG. 4 illustrates a flowchart of selecting a read-retry table and executing a first refresh operation according to an embodiment of the present invention.

The aforementioned first refresh operation and the selection of the read-retry table may be summarized in the flowchart shown in FIG. 4, which comprises the following steps:

Step 410: Create a programed timestamp corresponding to the first memory unit for the data writing time of each first memory unit;

Step 420: Select a corresponding read-retry table according to the programed timestamp of the first memory unit, in order to perform a reading operation upon the first memory unit; and Step 430: Execute a first refresh operation according to the programed timestamp of the first memory unit that has been written with data.

Since Steps 410-430 may be obtained by simplifying operations of the aforementioned embodiments, the detailed descriptions thereof are omitted here for brevity.

Figure 5:
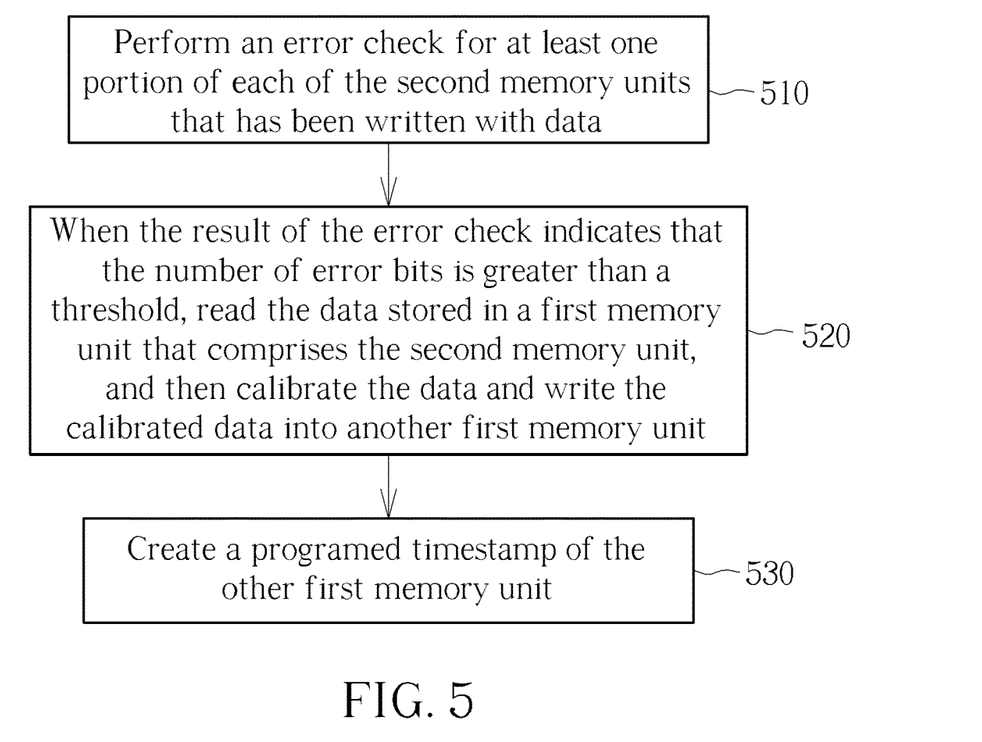
FIG. 5 illustrates a flowchart of a second refresh operation according to an embodiment of the present invention.

In an embodiment, to increase the reliability of data and to ensure the high success rate of read-retry, a second refresh operation may be further performed in addition to the first refresh operation. The flow of the second refresh operation is shown in FIG. 5, and comprises the following steps:

Step 510: Perform an error check for at least one portion of each of the second memory units that has been written with data; and Step 520: When the result of the error check indicates that the number of error bits is greater than a threshold, read the data stored in a first memory unit that comprises the second memory unit, and then calibrate the data and write the calibrated data into another first memory unit; and Step 530: Create a programed timestamp of the other first memory unit.

Figure 6:
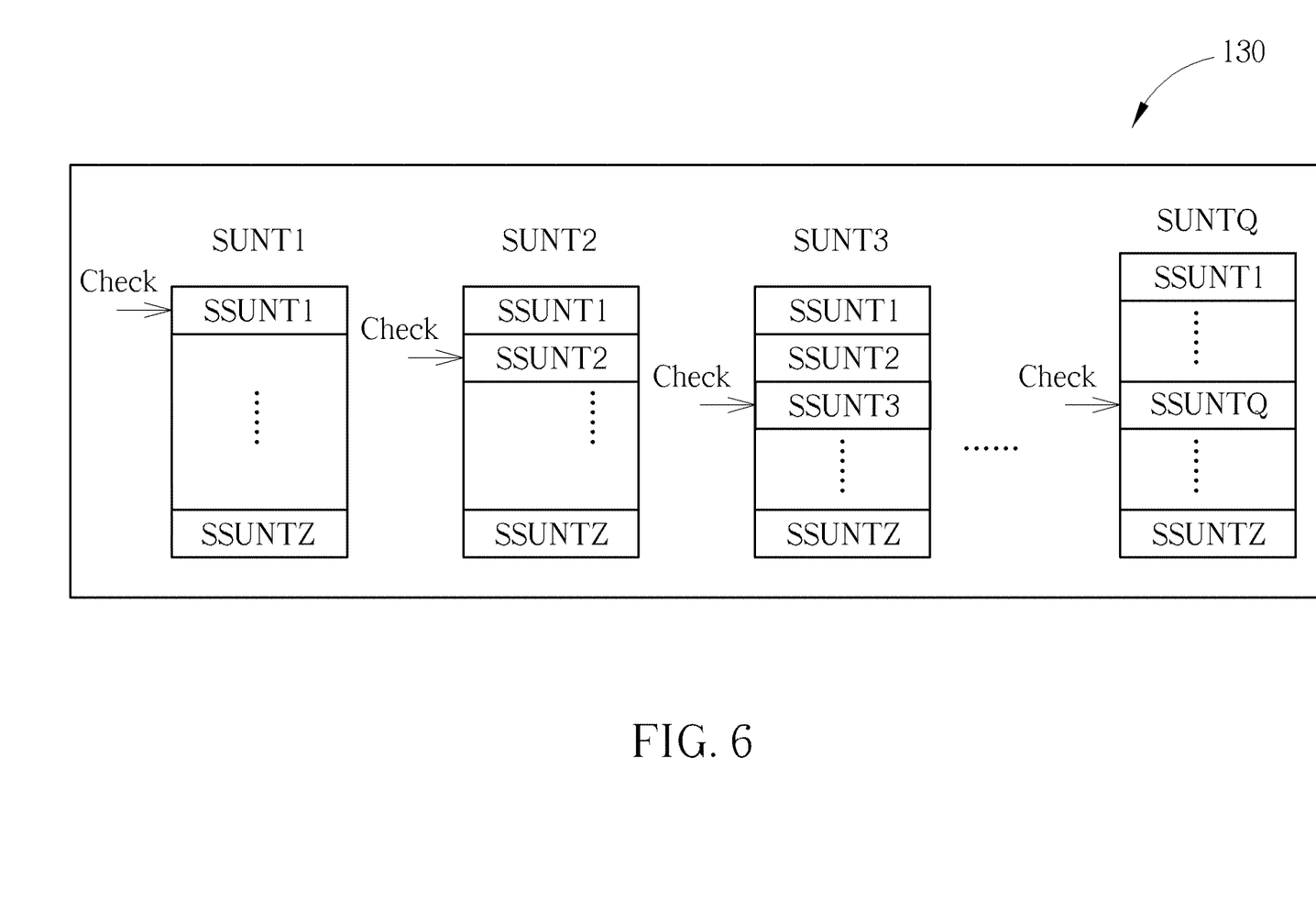
FIG. 6 illustrates the way of selecting a second sub-memory unit in an error check according to an embodiment of the present invention.

Please refer to FIG. 6 to further understand how the embodiments of the present invention perform the second refresh operation. FIG. 6 illustrates a way of selecting a second sub-memory unit in an error check according to an embodiment of the present invention. As shown in the figure, the flash memory 130 may comprise a plurality of same-sized second memory units SUNT1, SUNT2, . . . and SNTQ. Each of the memory units SUNT1-SUNTQ may further comprise the same number of second sub-memory units SSUNT1-SSUNTZ.

In Step 510, the controller 120 performs error checking on at least one portion of each second memory units of SUNT1-SUNTQ. In an embodiment, the controller 120 may select the second sub-memory unit SSUNT1 from the second memory unit SUNT1, select the second sub-memory unit SSUNT2 from the second memory unit SUNT2, etc., and may perform error checking upon the second sub-memory unit SSUNTQ selected from the second memory unit SNTQ. The above selection method is to avoid non-uniform sampling. For example, if in the checking of each second memory unit, the sub-memory unit SSUNT1 or the sub-memory unit SSUNTQ is selected from each second memory unit, it can be easy to overlook other memory units with different physical characteristics because the sub-memory units in the same numbering are similar in physical structure and physical characteristics. This may easily cause errors. In an embodiment, the second memory units SUNT1-SUNTP may be super pages, and the second sub-memory units SSUNT1-SSNTQ may be pages.

In the present invention, the second refresh operation is optional. To be specific, only when the selected second sub-memory unit cannot pass the error check, the controller 120 will perform a second refresh operation upon the second memory unit. In Step 520, the controller 120 determines whether the error check is passed via checking whether the number of error bits of the selected second sub-memory unit exceeds a threshold. If the result of the error check indicates that the number of error bits of at least one portion of second memory units is greater than a threshold, the controller 120 will read the data stored in the first memory unit that comprises the second memory unit, and then calibrates the data and writes the calibrated data into another first memory unit. That is, if an examination shows that the number of error bits of a specific page in a super page is too many, the data of a first super block that comprises the second super page will be refreshed. Step 530 is the step of creating a programed timestamp of the first memory unit. The above is the concept of the second refresh operation of the present invention.

Figure 7:
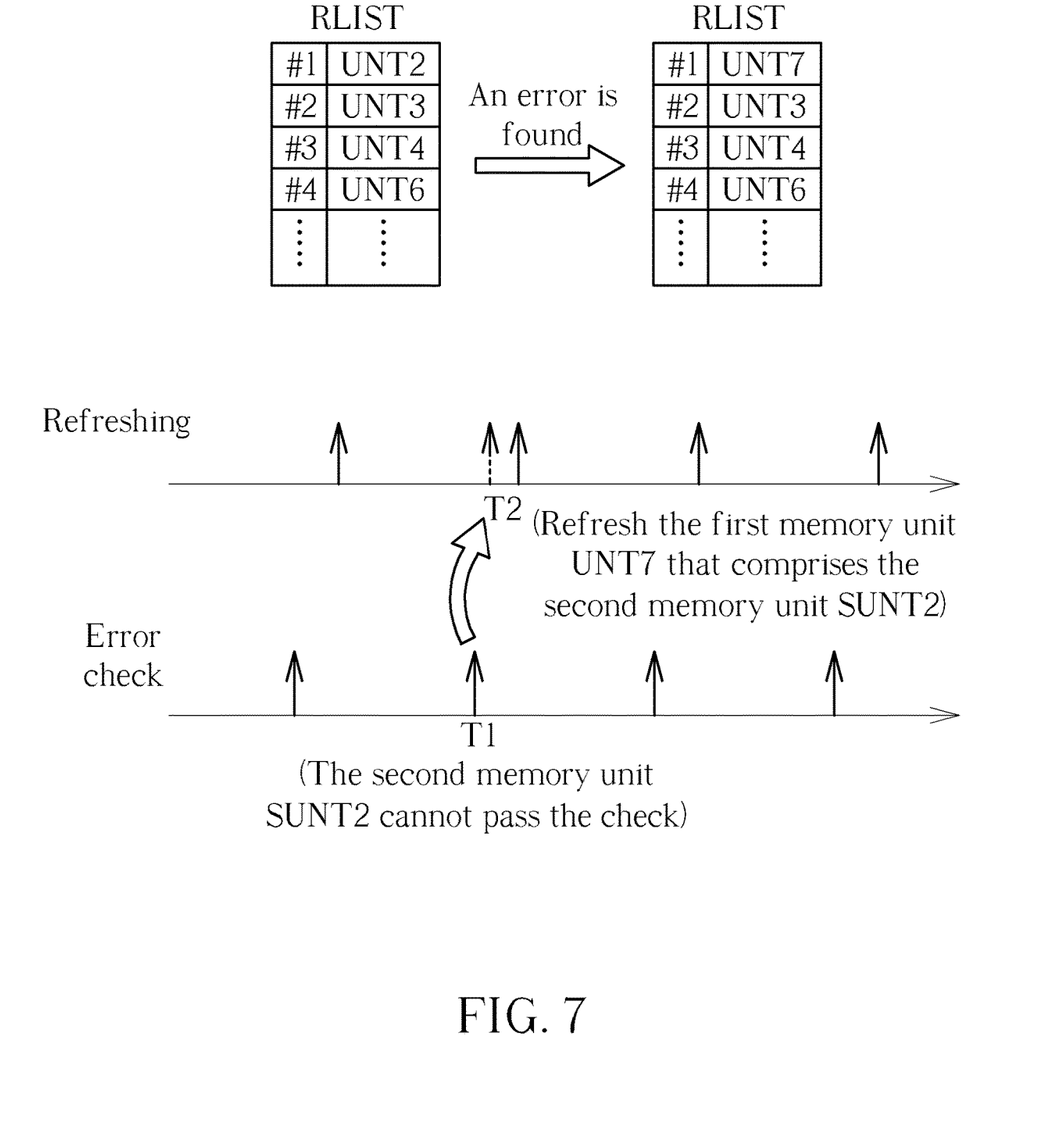
FIG. 7 illustrates the relationship between the first refresh operation and the second refresh operation according to an embodiment of the present invention.

In this embodiment, first memory units that need to be refreshed will be inserted into the sorting of the refresh list RLIST stored in storage unit 124 of the controller 120. Please refer to FIG. 7, which illustrates the relationship between the first refresh operation and the second refresh operation according to an embodiment of the present invention. As shown in FIG. 7, originally, the controller 120 refers to the refresh list RLIST to periodically sequentially perform the first refresh operation upon the memory units UNT2, UNT3, UNT4 and UNT6, and periodically performs error checking upon these memory units. However, when the controller 120 finds out at the time point T1 that the second memory unit SUNT2 which is under checking cannot pass the checking, the controller 120 will insert the second refresh operation corresponding to the first memory unit UNT3 that comprises the second memory unit SUNT2 into the refresh list RLIST, and will execute the refresh operation for the data in the first memory unit UNT3 at the time point T2.

As mentioned above, the present invention periodically performs refreshing upon the first memory unit (e.g. super block) that has been written with data, and in each employment history, the memory units that are written in the previous employment history are executed, which may effectively decrease the number of required read-retry tables. In addition, by periodically selecting a portion of the second memory unit (e.g. pages) to perform error checking, the read-retry can be effectively performed even when the number of the read-retry tables is decreased. In this way, the efficiency of read-retry can be enhanced tremendously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a plurality of memory units in a flash memory module, comprising:

creating a programed timestamp corresponding to each first memory unit according to a data-written time of said each first memory unit;

selecting a corresponding read-retry table for performing a read operation upon said each first memory unit according to the programed timestamp of said each first memory unit; and performing a first refresh operation according to program timestamps of first memory units that have been written with data, comprising:

executing the first refresh operation on a specific first memory unit when the programed timestamp indicates a time elapsed after the specific first memory unit is written or updated exceeds a threshold; and executing the first refresh operation in a second employment history, for a plurality of first memory units that have been written with data in a first employment history, wherein the second employment history lags behind the first employment history, and the first refresh operation completes refreshing for all first memory units during the second employment history.

2. The method of claim 1, further comprising:

performing an error check upon at least one portion of each of a plurality of second memory units that have been written with data; and performing a second refresh operation according to a result of the error check.

3. The method of claim 2, wherein performing the second refresh operation according to the result of the error check comprises:

when a result of the error check indicates that a number of error bits in at least one portion of a second memory unit is greater than a threshold, reading data stored in a first memory unit that comprises the second memory unit, and correct the data and write corrected data into another first memory unit; and creating a programed timestamp associated with the other first memory unit.

4. The method of claim 1, wherein selecting the corresponding read-retry table comprises:

selecting a first read-retry table based on reading first memory units that have been written with data during the first employment history; and selecting a second read-retry table based on reading first memory units that have been written with data during the second employment history.

5. The method of claim 1, wherein performing the first refresh operation comprises:

performing following steps for said each first memory unit:

reading data stored in said each first memory unit, and writing the data into another first memory unit; and creating a programed timestamp of the other first memory unit.

6. A controller for managing a plurality of memory units of a flash memory, comprising:

a storage unit, for storing a program code; and a processing unit, coupled to the storage unit, the processing unit arranged to read the program code from the storage unit, in order to execute the program code to perform following operations:

creating a programed timestamp correspond to each first memory unit for a data-written time of said each first memory unit;

selecting a corresponding read-retry table to perform a read operation upon said each first memory unit according to the programed timestamp of said each first memory unit;

executing a first refresh operation according to programed timestamps of first memory units that have been written with data;

executing the first refresh operation on a specific first memory unit when the programed timestamp indicates a time elapsed after the specific first memory unit is written or updated exceeds a threshold; and executing the first refresh operation in a second employment history for a plurality of first memory units that have been written with data in a first employment history, wherein the second employment history lags behind the first employment history, and the first refresh operation completes refreshing on all first memory units during the second employment history.

7. The controller of claim 6, wherein the processing unit executes the program code in order to perform an error check for at least one portion of each second memory unit that has been written with data, and executes a second refresh operation according to a result of the error check.

8. The controller of claim 7, wherein the processing unit executes the program code in order to read the data stored in a first memory unit of the second memory unit when a result of the error check indicates that a number of error bits in at least one portion of a second memory unit is greater than a threshold, and the processing unit corrects the data and writes corrected data to another first memory unit; and the processing unit creates a programed timestamp of the other first memory unit.

9. The controller of claim 6, wherein the processing unit executes the program code to perform following steps:
   selecting a first read-retry table based on reading first memory units that have been written with data during the first employment history; and
   selecting a second read-retry table based on reading first memory units that have been written with data during the second employment history.

10. The controller of claim 6, wherein the processing unit executes the program code to perform following steps upon said each first memory unit:
   reading data stored in said each first memory unit, and writing the data into another first memory unit; and
   creating a programed timestamp of the other first memory unit.

11. A storage device, comprises:
   a flash memory module, comprising a plurality of memory units; and
   a controller, arranged to access flash memory module, the controller comprising:
   a storage unit, arranged to store a program code; and
   a processing unit, coupled to the storage unit, the processing unit arranged to read the program code from the storage unit in order to execute the program code to perform following operations:
      creating a programed timestamp correspond to each first memory unit for a data-written time of said each first memory unit;
      selecting a corresponding read-retry table to perform a read operation upon said each first memory unit according to the programed timestamp of said each first memory unit; and
      executing a first refresh operation according to programed timestamps of first memory units that have been written with data;
      executing the first refresh operation on a specific first memory unit when the programed timestamp indicates a time elapsed after the specific first memory unit is written or updated exceeds a threshold; and
      executing the first refresh operation in a second employment history for a plurality of first memory units that have been written with data in a first employment history, wherein the second employment history lags behind the first employment history, and the first refresh operation refreshes all first memory units during the second employment history.

12. The storage device of claim 11, wherein the controller further performs an error check upon at least one portion of each second memory unit that have been written with data, and executes a second refresh operation according to a result of the error check.

13. The storage device of claim 12, wherein when a result of the error check indicates that a number of error bits in at least one portion of a second memory unit is greater than a threshold, the controller reads data stored in a first memory unit that comprises the second memory unit, corrects the data and writes corrected data into another first memory unit, and creates a programed timestamp of the other first memory unit.

14. The storage device of claim 11, wherein the controller selects a first read-retry table for first memory units that have been written with data during the first employment history; and the controller selects a second read-retry table for first memory units that have been written with data during the second employment history.

15. The storage device of claim 11, wherein the controller performs following operations upon each first memory unit:
   reading data stored in said each first memory unit, and writing the data into another first memory unit; and
   creating a programed timestamp of the other first memory unit in order to complete the first refresh operation.

* * * * *